Patented Dec. 5, 1944

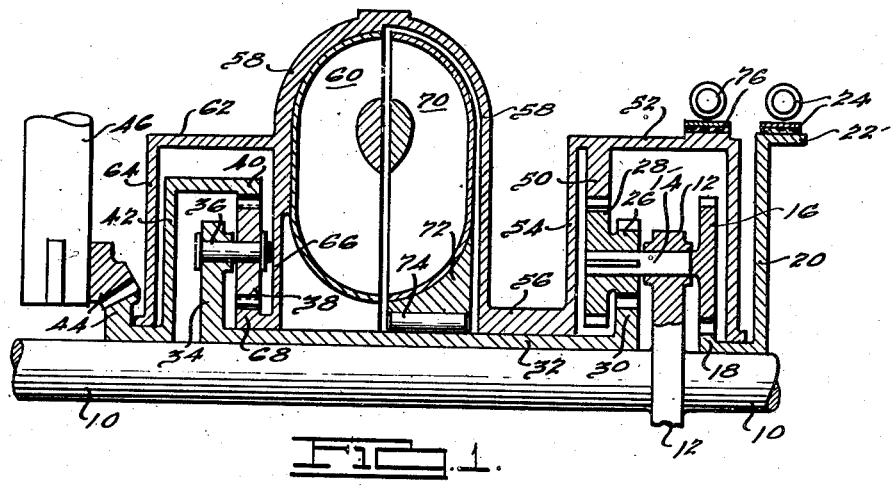

2,364,448

UNITED STATES PATENT OFFICE 2,364,448

TURBOTRANSMISSION

Joseph Jandasek, Detroit, Mich., assignor to Bendix Aviation Corporation, South Bend, Ind., a corporation of Delaware Application June 13, 1942, Serial No. 446,984

15 Claims. (Cl. 74—189.5)

This invention relates to transmissions and more particularly to a combined turbo and mechanical gear transmission operable to transmit energy from a driving shaft to a driven shaft in an improved manner whereby controlled regeneration of power in a two-path power flow transmission is provided.

An object of this invention is to provide a transmission having two-path power flow through mechanical gearing and a regenerative turbodrive interposed in one of the paths of power flow.

A further object of the invention is to provide a transmission having a controlled two-path power flow mechanical transmission having a turbounit interposed in one of the paths and wherein manually operable means are provided to render the fluid drive inoperative and transmit power solely through the mechanical gearing.

Another object of the invention is to provide a transmission having a driving shaft which if desired may be operably connected to a pair of spaced engines to transmit power through combined mechanical and fluid actuated transmissions to a driven shaft, and wherein means are provided to vary the speed ratio of multi-path power flow through the mechanical transmission and to render the fluid transmission inoperative to vary the speed and torque ratios of the driven shaft with reference to the driving shaft.

Yet a still further object of the invention resides in the provision of a power transmitter having a multi-path mechanical power flow device and a fluid actuated regenerative power transmitting device interposed in one of the paths of mechanical power flow and wherein manually operable means are provided to render one of the paths of power flow inoperative to also render inoperative the fluid power regenerative system and transmit power through another of the mechanical paths of power flow at increased speed to effect a mechanical overdrive.

Another object of this invention is to provide a combined mechanical and fluid actuated power transmitting mechanism wherein variable speed driving means are interposed between the regenerative system and the driving shaft.

A further object of the invention is to provide a regenerative power transmission wherein declutching means are provided to render inoperative the drive of the turbine to the driving shaft to render the regenerative system inoperative.

Yet a still further object of this invention is to provide a backwardly operating one-way clutch between a portion of a regenerative turbounit and a driving shaft operable when the driven shaft overruns the driving shaft to transmit power from the driven shaft to the driving shaft to prevent a free wheeling condition.

Another object is to provide one-way driving means between a driving shaft and a member driven by a regenerative turbodrive system.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view of a transmission device embodying this invention.

Fig. 2 is a longitudinal sectional view of a somewhat modified form of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to Fig. 1, it will be observed that a driving shaft 10 which may, if desired, be connected at opposite ends to spaced engines, is preferably provided with a radially extending flange 12 having planet pinion shafts 14 rotatably mounted therein. The planet pinion shafts have a plurality of spaced pinions 16 positioned to engage a sun gear 18 operably connected through a radially extending flange 20 to an axially extending flange 22 which may be held against rotation by any suitable means such for example as a brake mechanism 24.

The pinion shafts 14 are provided at their other end with spaced pinions 26 and 28 of different diameters as illustrated. The pinions 26 preferably mesh with a sun gear 30 fixed to a sleeve 32 preferably concentrically mounted on the driving shaft 10 and having a radially extending flange 34 having stub shafts 36 provided with suitable pinions 38.

The pinions 38 mesh with a ring gear 40 operably connected through a radially extending flange 42 and bevelled gears 44 with a driven shaft 46 disposed at any suitable angle with reference to the driving shaft 10.

The outer peripheries of the planet pinions 28 carried by the stub shafts 14 mesh with a ring gear 50 carried by a housing 52 surrounding the planetary gearing as illustrated. The housing 52 is provided with a radially extending flange 54 and an axially extending sleeve 56 preferably concentrically mounted on the sleeve 32 to rotate a casing 58 having a suitable impeller 60 positioned therein. The casing 58 is also provided with axially and radially extending flanges 62 and 64 respectively forming housings for the planetary gearing associated with the radially extending flange 34 carried by the driving sleeve 32. The casing 58 is operably connected through an inwardly extending flange 66 to a sun gear 68 meshing with the inner peripheries of the planet pinions 38 carried by the stub shafts 36 of the flange 34 fixed to the driving sleeve 32.

A turbine 70 of any suitable form is aligned with the impeller 60 and cooperates therewith to form a suitable power transmitting fluid circuit. The turbine 70 is provided with a hub 72 operably connected through a one-way clutch 74 to drive the driving sleeve 32.

The housing 52 is provided with a braking mechanism 76 whereby the ring gear 50 and sun gear 68 and casing 58 may be locked against rotation to render the regenerative turbounit inoperative and transmit power mechanically through the driving sleeve 32 and ring gear 40 to the drive shaft 46 at a preferably higher speed.

The operation of this device is as follows: Power is applied to one or both ends of the driving shaft 10 by suitable prime movers operably connected to either or both ends of the driving shaft 10. Rotation of the shaft 10 is transmitted through the radially extending flange 12 and pinion shafts 14 to rotate the pinions 16, 26 and 28.

With the brake structure 24 released to permit the sun gear 18 to rotate freely and the brake structure 76 released to permit the ring gear 50 and housing 52 to be actuated, power will be transmitted from the pinion shafts 14 through the planet pinions 26 to the sun gear 30 and from the planet pinions 28 to the ring gear 50. One path of power is transmitted through the ring gear 50 and is exerted through the members 54, 56, 58 and 66 to drive the sun gear 68 and impeller 60.

The other path of power flows from the pinion gears 26 through the sun gear 30, driving sleeve 32, flange 34, stub shafts 36, and pinions 38. Power thus exerted on the pinions 38 is augmented by the power from the first mentioned path of power flow through the sun gear 68 and the total power is applied to rotate the ring gear 40 operably connected through the inwardly extending flange 42 and bevelled gears 44 to drive the driven shaft 46.

The first mentioned path of power flow from the ring gear 50 results in rotation of the casing 58 to rotate the impeller 60, thereby energizing fluid and directing it to the turbine 70. Energy absorbed by the turbine 70 is transmitted through the hub 72 and one-way clutch 74 to be exerted on the driving sleeve 32, thereby increasing the power transmitted through the second path of power flow recited, through the driving sleeve 32 and proportionately decreasing the proportion of power transmitted through the path of power flow from the ring gear 50.

When it is desired to drive the driven shaft 46 at a higher speed than the normal drive, the brake mechanism 76 may be actuated to lock the housing 52 against rotation. The ring gear 50 and the casing 58 having the impeller 60 therein are then locked against rotation and power is transmitted from the driving shaft 10 through the pinions 26, sun gear 30 to the driving sleeve 32. Rotation of the driving sleeve 32 is transmitted through the members 34, 36, 38, 40, 42 and 44 to drive the driven shaft 46 at higher speed.

When it is desired to transmit power to the driven shaft 46 at lower speed than normal, the brake structure 24 may be actuated to lock the sun gear 18 against rotation. The pinions 16 then rotate about the sun gear 18 and power is transmitted through the pinions 26 and 28 through the sun gears 30 and ring gear 50 respectively to transmit power through both paths of power flow referred to above.

The diameter of the sun gear 18 with reference to the pinion gears 16 and the diameters of the pinion gears 26 and 28 determine the ratio of speed of each of the paths of power flow. Since when a gear ratio of these parts is ascertained the ratio of the sun gear 68 and pinions 38 and ring gear 40 can be ascertained, the speed of rotation of the driven shaft 46 will be determined when the ratio of the bevelled gears 44 is known.

In the embodiment of the invention illustrated in Fig. 2 a driving shaft 100 is preferably aligned with a driven shaft 102. The driving shaft is provided with a radial flange 104 having stub shafts 106 provided with spaced pinion gears 108 and 110 respectively. The driven shaft 102 is formed with a radial flange 112 operably connected to a ring gear 114 through an axially extending flange 116. The ring gear 114 preferably meshes with the pinion gears 108 to transmit power from the driving shaft 100 to the driven shaft 102.

The pinion gears 110 mesh at their outer peripheries with a ring gear 118 carried by a rotatable housing 120 adapted to be locked against rotation by a brake structure 122 to vary the speed ratio of power transmitted from the driving shaft 100 to the driven shaft 102.

The inner peripheries of the pinion gears 110 mesh with a sun gear 124 carried by a sleeve 126 provided with an impeller 128 having an impeller channel 130 aligned with a turbine member 132 having a channel and cooperating with the impeller channel to form a power transmitting fluid circuit. The turbine 132 is housed in a casing 134 having an inwardly extending flange 136 preferably concentrically mounted on the sleeve 126 and an axially extending flange 138 having a ring gear 140 meshing with planet pinions 142 mounted on stub shafts 144 carried by a member 146 concentrically mounted on the driving shaft 100 and operably connected therewith through one-way driving means 148. The planet pinions 142 also have planet pinions 150 preferably of a different diameter meshing with a sun gear 152 carried by a radially extending flange 154 terminating in an axially extending flange 156 adapted to be engaged by a brake structure 158 to hold the sun gear 152 against rotation.

The inner peripheries of the pinion gears 142 mesh with a sun gear 160 carried by an axially extending sleeve 162 mounted on a radially extending flange 164 terminating in an axially extending flange 166 adapted to be engaged by a braking structure 168.

A backwardly operating one-way clutch 170 may be interposed between the impeller web 128 and the driving shaft 100 to prevent free wheeling of the vehicle when the driven shaft 102 overruns the speed of rotation of the driving shaft 100.

The operation of this embodiment of the invention is as follows: Power transmitted from the driving shaft 100 is exerted through the flange 104 and stub shafts 106 to drive the pinion gears 108 operably connected through the ring gear 114 to rotate the driven shaft 102.

A portion of the power from the driving shaft is transmitted through the pinion gears 110, through the sun gear 124, sleeve 126 and impeller web 128 to permit the impeller 130 to energize fluid in the turbounit. Rotation of the turbine 132 is transmitted through the flange 138 and ring gear 140 to rotate the planet pinions 142 operably connected through the stub shaft 144 and member 146 and one-way clutch 148 to regenerate a portion of the applied power back to the driving shaft 100 when the brake structure 168 is actuated to hold the sun gear 160 against rotation.

When still greater regeneration of power is desired, the brake structure 168 is released and the brake structure 158 is actuated to hold the sun gear 152 against rotation. Pinion gears 150 then rotate about the sun gear 152, increasing the speed of rotation of the stub shafts 144 and member 146 transmitted through the one-way clutch 148 to the driving shaft 100.

If no regeneration of power is desired, the brake structures 158 and 168 may both be released whereupon the ring gear 140 will rotate freely about the drive shaft 100 and no power will be transmitted through the turbounit.

If a low speed mechanical drive is desired, the brake structure 122 may be actuated to lock the ring gear 118 against rotation. The pinion gears 110 then rotate within the ring gear 118 and power is transmitted through the pinions 108 and the ring gear 114 to the driven shaft 102 at a reduction in speed.

I claim:

1. A transmission comprising a driving shaft, axially spaced groups of planet pinions operably connected to the driving shaft, axially spaced ring and sun gears operably connected to said planet pinions, auxiliary planet pinions spaced from said first named planet pinions, two path driving means between said ring and sun gears and said last named planet pinions, driving means between the last named planet pinions and the driven shaft, a regenerative turbounit interposed between said planet pinions comprising spaced impeller and turbine members cooperating to form a power transmitting fluid circuit interposed between said planet pinions and driven by one of said paths of power flow, and one-way driving means between the turbine and the other of said paths of power flow.

2. A transmission comprising driving and driven shafts, planetary gearing interposed between the driving and driven shafts, an impeller driven by the planetary gearing, a turbine aligned with the impeller and cooperating therewith to form a power transmitting fluid circuit, speed varying means associated with the turbine, and one-way driving means between the speed varying means and the driving shaft.

3. A transmission comprising driving and driven shafts, planetary gearing interposed between the driving and driven shafts, an impeller operably connected to the planetary gearing, a turbine aligned with the impeller and cooperating therewith to form a power transmitting fluid circuit, and one-way driving means between the impeller and the driving shaft to arrest backward rotation of the driving shaft with reference to the driven shaft when the speed of rotation of the driven shaft overruns the speed of rotation of the driving shaft.

4. A transmission comprising a driving shaft, a driven shaft, planetary gearing between the driving and driven shafts, a turbounit comprising an impeller driven by the planetary gearing, a turbine aligned with the impeller and cooperating therewith to form a power transmitting fluid circuit, speed varying planetary gearing between the turbine and the driving shaft, and one-way driving means between the speed varying planetary gearing and the driving shaft.

5. A transmission comprising driving and driven shafts, planetary gearing interposed between the driving and driven shafts, axially spaced pinion gears driven by said planetary gearing, an impeller driven by said pinion gears, a turbine aligned with the impeller and cooperating therewith to form a power transmitting fluid circuit, speed varying planetary gearing driven by the turbine, and one-way driving means between the speed varying planetary gearing and driving shaft.

6. A transmission comprising driving and driven shafts, planetary gearing interposed between the driving and driven shafts, axially spaced pinion gears driven by said planetary gearing, an impeller driven by said pinion gears, a turbine aligned with the impeller and cooperating therewith to form a power transmitting fluid circuit, one-way driving means between the turbine and driving shaft, and one-way driving means between the impeller and the driving shaft to prevent backward rotation of the driven shaft relative to the driving shaft.

7. A transmission comprising a driving shaft, a driven shaft, spaced planetary gear means, fluid power transmitting means interposed between the spaced planetary gearing, one-way driving means between one of said planetary gear means and the driving shaft, and speed varying means interposed between said planetary gear means and the driving shaft.

8. A transmission comprising a driving member, a driven member, spaced planetary gear means, connecting means between one of the planetary gear means and the driven member, fluid power transmitting means comprising aligned impeller and turbine members cooperating to form a power transmitting fluid circuit interposed between said spaced planetary gearing, one-way driving means associated with the turbine member to exert power to a driving member, and speed varying means associated with one of said planetary gear means to vary the speed of the one-way driving means.

9. A transmission comprising a drive shaft, a driven shaft, variable speed planetary gearing associated with the driving shaft, planetary gearing associated with the driven shaft, two paths of power flow between said planetary gearing, a regenerative fluid transmission comprising an impeller interposed in one of said paths of power flow to be driven by the variable speed planetary gearing associated with the driving shaft, a turbine aligned with the impeller and cooperating therewith to form a power transmitting fluid circuit, and one-way driving means between the turbine and the other of said paths of power flow.

10. A transmission comprising a drive shaft, a driven shaft, spaced planetary gear means associated with the driving and driven shafts, two paths of power flow between the spaced planetary gear means, a regenerative fluid transmission interposed in one of the paths of power flow, a turbine aligned with the impeller and cooperating therewith to form a power transmitting fluid circuit, one-way driving means between the turbine and the other of said paths of power flow, and speed varying means associated with one of said planetary gear means to vary the speed of the impeller.

11. A transmission comprising a driving shaft, variable speed planetary gearing associated with the driving shaft, a driven shaft, planetary gearing associated with the driven shaft, two paths of power flow interposed between the planetary gearing associated with the driving and driven shafts, a fluid transmission comprising impeller and turbine members cooperating to form a power transmitting fluid circuit, connecting means between the impeller and the variable speed planetary gearing whereby the impeller may be driven at different speeds, and one-way driving means between the turbine and the other of said paths of power flow.

12. A transmission comprising a driving member, a driven member, spaced planetary gear sets, connecting means between one of the planetary gear sets and the driven member, fluid power transmitting means comprising an impeller driven by one of said planetary gear sets, manually operable means associated with one of the planetary gear sets to vary the speed of rotation of the impeller, a turbine associated with the impeller and cooperating therewith to form a power transmitting fluid circuit, and one-way driving means associated with the turbine to direct power to a driving member.

13. A transmission comprising a driving shaft, speed varying planetary gearing driven by the driving shaft, a driven shaft, planetary gearing to drive the driven shaft, concentrically disposed driving means between the speed varying planetary gearing and the planetary gearing to provide two paths of power flow between the driving and driven shafts, a fluid transmission comprising an impeller driven by the speed varying planetary gearing through one of said paths of power flow and a turbine aligned with the impeller and cooperating therewith to form a power transmitting fluid circuit, and one-way driving means between the turbine and the other of said paths of power flow.

14. A transmission comprising driving and driven shafts, speed varying planetary gear means between the driving and driven shafts, a regenerative fluid power transmission comprising an impeller driven by said speed varying planetary gear means, a turbine aligned with the impeller and cooperating therewith to form a power transmitting fluid circuit, a member concentrically mounted on the driving shaft, one-way driving means between said member and the driving shaft, and speed varying planetary gear means between the turbine and said member.

15. A transmission comprising aligned driving and driven shafts, speed varying planetary gear means between the driving and driven shafts, an impeller concentrically mounted on the driving shaft and driven by the planetary gear means, one-way driving means between the impeller and the driving shaft to permit forward rotation of the driving shaft relative to the impeller, a turbine aligned with the impeller and cooperating therewith to form a power transmitting fluid circuit, speed varying planetary gearing driven by the turbine, and one-way driving means between the planetary gearing and the driving shaft.

JOSEPH JANDASEK.